FREQUENCY DISCRIMINATOR

Filed Oct. 20, 1950

INVENTOR
Oscar B. Dutton
BY
Charles H. Brown
ATTORNEY

Patented Oct. 6, 1953

2,654,841

UNITED STATES PATENT OFFICE 2,654,841

FREQUENCY DISCRIMINATOR

Oscar B. Dutton, Redondo Beach, Calif., assignor to Radio Corporation of America, a corporation of Delaware Application October 20, 1950, Serial No. 191,120

4 Claims. (Cl. 250—27)

This invention relates to a frequency discriminator circuit, and more particularly to a circuit for producing a direct voltage the polarity and magnitude of which depend upon the frequency of the alternating signal applied thereto.

Several well-known types of frequency sensitive discriminators have been described in the literature. However, one feature common to most types of known discriminator circuits is the use of one or more resonant circuit elements. In the audio and lower frequency radio spectrum, resonant circuit elements present a number of problems which are not easily solved.

An object of this invention is to devise a frequency sensitive discriminator circuit which is relatively simple in construction and which requires no resonant circuit elements.

Another object is to devise a discriminator which can be easily adjusted over a wide range of frequencies.

Figure 1:
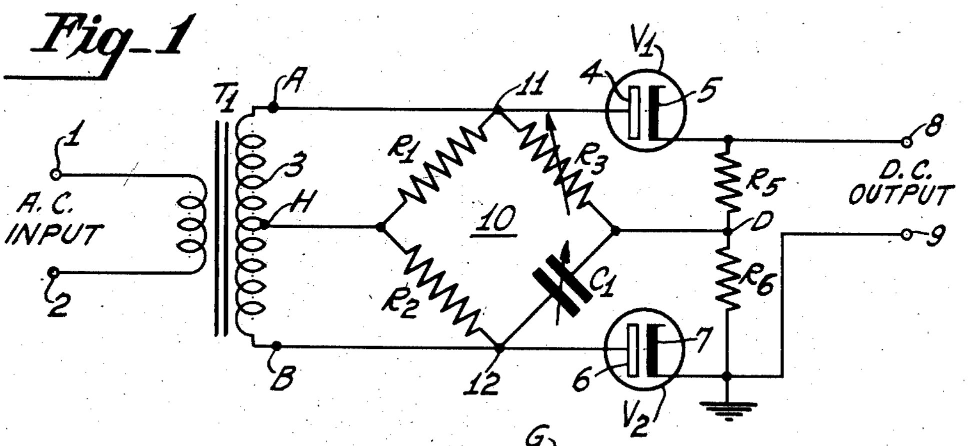
Figure 2:
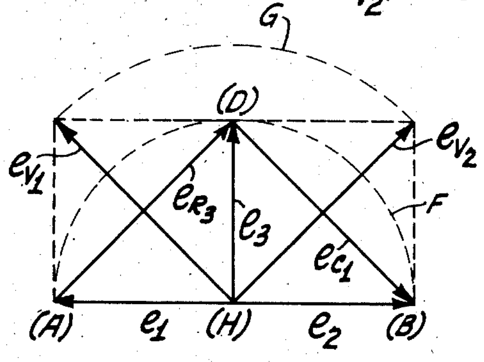
Figure 3:
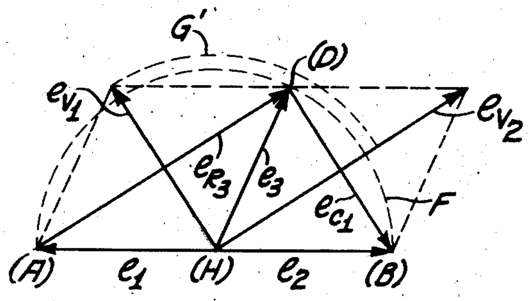
Figure 4:
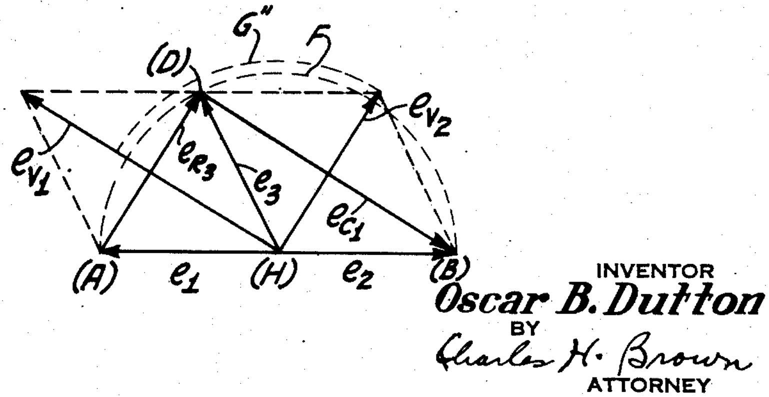

The foregoing and other objects of the invention will be best understood from the following description of an examplification thereof, reference being had to the accompanying drawing, wherein:

Fig. 1 is a diagrammatic representation of a discriminator according to this invention; and Figs. 2, 3 and 4 are vector diagrams useful in explaining the operation of the circuit.

Briefly, the objects of this invention are accomplished in the following manner: A transformer and phase shifting circuit both couple alternating current from an input frequency source to two rectifiers connected in opposition to two series-connected resistor loads. A direct voltage is produced across these two loads, this voltage being of positive or negative polarity (with respect to ground), depending on the input frequency. One or more of the elements of the phase shifting circuit may be varied to vary or adjust the center frequency of the discriminator.

Fig. 1 is a circuit diagram of a discriminator circuit according to this invention. The alternating current input to the discriminator, having a finite frequency greater than zero, is applied between the input terminals 1 and 2, which are connected to opposite ends of the primary winding of a suitable transformer $T_1$. The frequency of the alternating current input at 1, 2 may have any suitable value; however, this invention is particularly useful for input frequencies in the audio and low radio frequency range. The upper end A of secondary winding 3 of transformer $T_1$ is connected to the electron-collecting electrode 4 of a rectifier $V_1$, which rectifier may be of the vacuum diode type having an electron-emissive electrode 5. The lower end B of winding 3 is connected to the electron-collecting electrode 6 of a rectifier $V_2$, which may be similar to $V_1$ and which may have an electron-emissive electrode 7.

A bridge-type resistance-capacitance (RC) phase shifting circuit 10, consisting of three resistors $R_1$, $R_2$ and $R_3$ and a capacitor $C_1$, is connected in effect between a secondary 3 and the rectifiers $V_1$ and $V_2$. Specifically, between electrodes 4 and 6 there are two parallel circuits, one consisting of resistors $R_1$ and $R_2$ in series and the other consisting of resistor $R_3$ and capacitor $C_1$ in series. The junction point between resistors $R_1$ and $R_2$ is connected to the midpoint H of secondary 3.

An output circuit arrangement is provided by means of two resistors $R_5$ and $R_6$ connected in series between electrode 5 and ground or electrode 7. Thus, the two rectifiers $V_1$ and $V_2$ are connected in opposition to the two resistor loads $R_5$ and $R_6$. The direct current output of the discriminator appears between terminal 8, connected to the upper end of $R_5$, and terminal 9, connected to the lower end of $R_6$ or ground. In order to complete connections to circuit 10, the junction point between $R_3$ and $C_1$ is connected to point D, the junction between resistors $R_5$ and $R_6$.

First, let us consider the action of the phase shifting circuit 10. The alternating current signal voltage is applied to the primary winding of transformer $T_1$. The voltages $e_1$, between points A and H, and $e_2$, between points H and B, developed across the two halves of the secondary winding, are applied to the input terminals 11 and 12 of circuit 10. If resistors $R_1$, $R_2$ and $R_3$ are equal in value and if the ohmic reactance of capacitor $C_1$ is equal to the ohmic resistance of one of the resistors, a third voltage $e_3$ will be developed between the junction of $R_1$ and $R_2$, point H, and the junction of $R_3$ and $C_1$, point D. This voltage will be equal in magnitude to $e_1$ or $e_2$ and, for the conditions stated, will be displaced 90° from $e_1$ and $e_2$. In other words, if the input voltage is substantially constant, a substantially constant voltage may be taken from between points H and D.

This effect may be more clearly illustrated by the vector diagram of Fig. 2, wherein it will be seen that the two voltages across resistors $R_1$ and $R_2$ are equal, as indicated by vectors $e_1$ and $e_2$, and are in opposite directions as considered with respect to point H, as indicated. Since output from network 10 is taken from the junction between $R_1$ and $R_2$, the juncture of vectors $e_1$ and $e_2$ defines one end of the voltage vector $e_3$ output. Since the characteristics of impedances $R_3$ and $C_1$ are always in quadrature with respect to each other and further since the voltage across them always equals the voltage between A and B, the vector locus of the voltage $e_3$ at point D (between $R_3$ and $C_1$) lies on a semi-circle F having a radius equal to $e_1$ or $e_2$. Since the output from circuit 10 is taken from between point H (between $R_1$ and $R_2$) and point D (between impedances $R_3$ and $C_1$), the vector representing this voltage $e_3$ will always be equal to the radius of the semi-circle and hence constant. Therefore, $e_3$ will always be equal in magnitude to $e_1$ and $e_2$.

Fig. 2 illustrates the relations existing when the reactance of capacitor $C_1$ is equal to any one of the resistors. In this particular case, voltage $e_3$ is at 90° from $e_1$ and $e_2$.

It is to be noted from Fig. 1 that the total voltage applied to rectifier $V_1$ is the vector resultant of voltage $e_1$, between A and H, and the phase shifted voltage $e_3$, appearing across the output terminals H and D of phase shifting circuit 10. This resultant of $e_1$ and $e_3$ is indicated by the vector $e_{v1}$ in Fig. 2.

Similarly, the total voltage applied to rectifier $V_2$ is the vector resultant of voltage $e_2$, between H and B, and the phase shifted voltage $e_3$. This resultant is indicated by the vector $e_{v2}$ in Fig. 2.

The two vectors $e_{v1}$ and $e_{v2}$ are equal in magnitude in Fig. 2, as indicated by the dotted arc G joining their tips. Since they are equal in magnitude, the rectified voltages produced across $R_5$ and $R_6$ will be equal and opposite. Therefore, their algebraic sum, between terminals 8 and 9, will be zero, giving zero voltage out of the discriminator. Fig. 2 illustrates the conditions existing in the circuit when the frequency of the alternating current input at terminals 1 and 2 is equal to the center frequency to which the discriminator has been adjusted. When this is the situation, the discriminator provides zero direct current output.

Fig. 3 is a vector diagram somewhat similar to Fig. 2 but representing the relations existing when the alternating current input frequency at 1, 2 is on one particular side of the center frequency to which the discriminator has been adjusted. The reactance of capacitor $C_1$ depends upon and varies with the applied alternating current frequency; therefore, when the applied alternating current frequency varies from that represented in Fig. 2, the relative lengths of voltage vectors $e_{R3}$ and $e_{C1}$ will change as indicated in Fig. 3, if the variation of frequency from the conditions of Fig. 2 is in a particular direction. However, the vectors $e_{R3}$ and $e_{C1}$ will still be at right angles to each other and their point of intersection D will still lie on semi-circle F, since the voltage across $R_3$ and $C_1$ must always equal the voltage between A and B. Under the "off-frequency" conditions of Fig. 3, voltage $e_3$ is at an acute angle to $e_2$ and at an obtuse angle to $e_1$.

As before, the resultant of $e_3$ and $e_1$ is $e_{v1}$ and is applied to rectifier $V_1$. The resultant of $e_3$ and $e_2$ is $e_{v2}$ and is applied to rectifier $V_2$. Under the changed conditions of $V_3$, the vectors $e_{v1}$ and $e_{v2}$ are no longer equal in magnitude, as indicated by the dotted arc G'; $e_{v2}$ is now greater in magnitude than $e_{v1}$.

The rectified voltages across $R_5$ and $R_6$ will now be unequal, giving a net voltage out of the discriminator. Since the resultant voltage applied to $V_2$ is greater than that applied to $V_1$, the algebraic sum of the voltages across $R_5$ and $R_6$ will now give a direct voltage at terminal 8 which is negative with respect to ground terminal 9. Under these conditions, the discriminator provides negative direct current output.

Fig. 4 represents the relations existing when the alternating current input frequency at 1, 2 is again different from the center frequency, but on the side opposite to that represented by Fig. 3. The relative lengths of voltage vectors $e_{R3}$ and $e_{C1}$ will change oppositely from Fig. 3 if the input frequency changes in the opposite direction, these vectors, however, still being at right angles to each other and their point of intersection lying on semi-circle F. Under the "off-frequency" conditions of Fig. 4, voltage $e_3$ is at an obtuse angle to $e_2$ and at an acute angle to $e_1$.

The resultant of $e_3$ and $e_1$ is $e_{v1}$ and is applied to rectifier $V_1$. The resultant of $e_3$ and $e_2$ is $e_{v2}$ and is applied to rectifier $V_2$. Again, the vectors $e_{v1}$ and $e_{v2}$ are no longer equal in magnitude, as indicated by the dotted arc G''; $e_{v1}$ is now greater in magnitude than $e_{v2}$.

The rectified voltages across $R_5$ and $R_6$ will again be unequal, giving a net voltage out of the discriminator. Since the resultant voltage applied to $V_1$ is greater than that applied to $V_2$, the algebraic sum of the voltages across $R_5$ and $R_6$ will now give a direct voltage at terminal 8 which is positive with respect to ground terminal 9. Under these conditions, the discriminator provides positive direct current output.

For Figs. 3 and 4, the greater the difference of output frequency from the predetermined center frequency of the discriminator, the greater will be the angular variation of vector $e_3$ from the quadrature relation of Fig. 2, the greater will be the difference in magnitude between $e_{v2}$ and $e_{v1}$, and the greater the discriminator output. The direct voltage discriminator outputs will be of opposite polarity for opposite directions of input frequency variation with respect to the discriminator center frequency.

In the discriminator of this invention, no resonant circuit elements are utilized, as may be seen.

It has been pointed out that the point D may be caused to move along the semi-circle F by a change in the reactance of capacitance $C_1$. This movement of point D can be produced also, in addition to the movement of such point by variations in input frequency, by a physical variation of the capacitance of $C_1$. Point D can also be moved by a physical variation of the resistance of $R_3$, since the impedances $R_3$ and $C_1$ are in quadrature with respect to each other and since the voltage across them always equals the voltage between A and B. Or, to put it another way, and since the location of point D on semi-circular locus F determines the relative phase of voltage vector $e_3$, by the adjusting of the relative magnitudes of $R_3$ and $C_1$, the phase but not the magnitude of voltage $e_3$ may be correspondingly adjusted. This physical adjustment of $R_3$ and/or $C_1$ enables easy corresponding adjustment of the center frequency of the discriminator. This may be thought of in the following way. For example, Fig. 3 represents "of-frequency" conditions with respect to the "center frequency" conditions of Fig. 2; in other words, there is an input frequency difference between the conditions of Figs. 2 and 3. Assuming we are on Fig. 3 frequency, physical adjustment of $R_3$ and/or $C_1$ can cause point D to move around counterclockwise on locus F to the "zero output" condition of Fig. 2. This means that the frequency represented by Fig. 3, formerly an "off-frequency," is now the "center frequency" and the center frequency of the discriminator has been adjusted to a new value. This adjustment of the center frequency can be effected by variation of either element $R_3$ or $C_1$, or by variation of both if desirable. Thus, the center frequency is easily adjustable over a wide range.

The center frequency of the discriminator may be adjusted, for example, over a range extending from ten cycles to several megacycles, with an appropriate choice of resistance and capacitance values. With fixed values for $R_1$, $R_2$ and $C_1$, by varying $R_3$ the center frequency of the discriminator may be readily adjusted over a range of two octaves.

Although circuit 10 has been described as including a capacitor this has been done only by way of example. It is desired to be pointed out that $C_1$ can be replaced with an inductor having a corresponding value of reactance. If this is done, the discriminator will function in a similar manner, since circuit 10 will again give the proper phase shift.

The discriminator of this invention has numerous applications. For example, it may be used to provide an AFC voltage for the stabilization of low power oscillators in the audio or radio frequency spectrum, since the circuit elements can be made insensitive to temperature and vibration. Also, if the control for varying $R_3$ is calibrated in terms of frequency, the arrangement could be used as a null indicating frequency meter, with a suitable zero center galvanometer, or other means, connected to terminals 8 and 9 to indicate zero output voltage. Again, the discriminator might be used as a simple frequency meter to indicate deviation of an oscillator from its nominal frequency. Moreover, it is possible to use the discriminator of this invention wherever a tuned-circuit type of discriminator is used, if the selectivity requirements are not too stringent.

What I claim to be my invention is as follows:

1. A frequency discriminator circuit comprising an input impedance having a pair of end terminals between which an alternating input voltage appears, a pair of rectifiers each having an input electrode and an output electrode, means coupling the input electrode of each rectifier to a corresponding one of said terminals, a pair of output impedances coupled in series between the output electrodes of the two rectifiers, a bridge-type frequency-responsive phase shifting impedance network having four arms and having a pair of input and a pair of conjugate output terminals, means connecting each of said input terminals to a corresponding one of said first-named terminals, means coupling one of said output terminals to an intermediate point on said input impedance, and means coupling the other output terminal to the junction of said pair of output impedances.

2. A frequency discriminator circuit comprising an input impedance having a pair of end terminals between which an alternating input voltage appears, a pair of rectifiers each having an input electrode and an output electrode, means coupling the input electrode of each rectifier to a corresponding one of said terminals, a pair of output impedances coupled in series between the output electrodes of the two rectifiers, a pair of resistors connected in series between said terminals, a series combination of a resistor and a reactor having a quadrature characteristic, with respect to said last-named resistor, connected between said terminals, a connection between the junction of said pair of resistors and an intermediate point on said input impedance, and a connection between the junction of said last-named resistor and said reactor and the junction of said pair of output impedances.

3. A frequency discriminator circuit comprising an input impedance having a pair of end terminals between which an alternating input voltage appears, a pair of rectifiers each having an input electrode and an output electrode, means coupling the input electrode of each rectifier to a corresponding one of said terminals, a pair of output impedances coupled in series between the output electrodes of the two rectifiers, a pair of resistors of equal value connected in series between said terminals, a series combination of a resistor of like value and a reactor having a quadrature characteristic, with respect to said last-named resistor, connected between said terminals, the ohmic reactance of said reactor at a predetermined frequency being equal to the ohmic resistance of any one of said resistors, a connection between the junction of said pair of resistors and an intermediate point on said input impedance, and a connection between the junction of said last-named resistor and said reactor and the junction of said pair of output impedances.

4. A circuit in accordance with claim 3, wherein the reactor is a capacitor.

OSCAR B. DUTTON.

References Cited in the file of this patent

UNITED STATES PATENTS

| Number | Name | Date |
|---|---|---|
| 2,210,936 | Geyger | Aug. 13, 1940 |
| 2,382,015 | Langen | Aug. 14, 1945 |
| 2,415,468 | Webb | Feb. 11, 1947 |
| 2,489,313 | Parker | Nov. 29, 1949 |
| 2,601,340 | Stachura | June 24, 1952 |